3,242,045
TRIHALOMETHYL-SULPHENYLAMINO-
BENZOTHIAZOLE FUNGICIDES
Hans Scheinpflug, Leverkusen, Germany, Herbert Ferdinand Jung, Tokyo, Japan, and Erich Klauke, Cologne, Flittard, and Engelbert Kühle, Bergisch Gladbach, Germany, assignors to Farbenfabriken Bayer Aktiengesellschaft, Leverkusen, Germany, a German corporation
No Drawing. Filed Sept. 29, 1964, Ser. No. 400,220
Claims priority, application Germany, Oct. 12, 1963, F 40,976
7 Claims. (Cl. 167—33)

The present invention relates to the use of partly known aminobenzothiazoles as fungicides.

It is an object of the present invention to provide fungicidal agents which have a high fungicidal activity, especially against *Piricularia oryzae*. Another object of the invention consists in providing fungicidal agents which are especially well suited for being combined with curative fungicides. Further objects can be seen from the following description and the examples.

It has been found that 2-aminobenzothiazoles of the formula

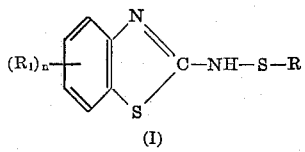

(I)

in which

R stands for a methyl group substituted by chlorine, bromine and/or fluorine and containing at least one chlorine atom, $R_1$ stands for hydrogen halogen, alkoxy with 1–4 carbon atoms, alkyl with 1–4 carbon atoms and/or nitro, and $n$ stands for an integer of 0–4, have a strong fungicidal activity, especially against *Piricularia oryzae*.

The aminobenzothiazoles to be used according to the invention can be seen from the above Formula I. In this formula R preferably stands for a trihalomethyl group which contains at least one chlorine atom. $R_1$ preferably stands for chlorine, bromine, alkoxy with 1–2 carbon atoms, alkyl with 1–2 carbon atoms and/or nitro; $n$ preferably stands for an integer of 0–3.

The radical R may be a fluorodichloromethyl, trichloromethyl, fluorochlorobromo-methyl, dichlorobromo-methyl or difluorochloro-methyl radical, for example.

Suitable compounds are, for example, 2-(fluorodichloromethyl-sulphenylamino)-benzothiazole, 2-(fluorochlorobromomethyl-sulphenylamino)-4-chlorobenzothiazole, 2-(dichlorobromomethyl-sulphenylamino)-6-ethoxybenzothiazole, 2-(difluorochloromethyl-sulphenylamino)-3-nitrobenzothiazole.

Some of the 2-aminothiazoles to be used according to the invention are known. The hitherto unknown compounds can be prepared in the same manner as the compounds already known, for example by reacting 2-aminobenzothiazoles with an appropriately halogenated methane-sulphene chloride [cf. Ber. 95, 1 637 (1962)].

The 2-aminobenzothiazole derivatives have a strong fungitoxic activity which becomes especially effective in the case of protective application. Due to their low toxicity towards warm-blooded animals they are suitable for combating undesired fungus growth. Their good compatibility with higher plants enables them to be used as plant protective agents against fungus diseases.

Fungitoxic agents are used in plant protection for combating fungi belonging to various classes, such as, for example, Archimycetes, Phycomycetes, Ascomycetes, Basidiomycetes, *Fungi imperfecti*.

Among the organic fungicides, such as N-trichloromethyl-thiotetrahydrophthalimide, the metal salts of ethylene-bis-dithiocarbamic acid, or tetramethyl-thiuram disulphide, no compound has hitherto become known which has, in practice, a sufficient effect for combating rice diseases. For this reason, the substances have hardly been used for the practical control of these diseases.

The 2-aminobenzothiazole derivatives have proved particularly satisfactory for combating rice diseases. They have an excellent protective effect in combating *Piricularia oryzae* on rice plants. They also have a toxic activity against other fungi causing rice diseases, such as *Cochliobolus miyabeanus* and *Corticium sasakii*.

Organic mercury compounds, e.g. phenyl-mercury acetate (PMA), the antibiotic Blasticidin S, or mixtures of these two preparations have hitherto been used for combating rice diseases, especially those caused by the fungus *Piricularia oryzae*. However, the organic mercury compounds have the great disadvantage of having a high toxicity towards warm-blooded animals. Furthermore, some organic mercury compounds, e.g., phenyl-mercury acetate, have a phytotoxic effect on a number of rice varieties. The organic mercury compounds as well as the antibiotic Blasticidin S have a good curative but only a weak protective effect.

Moreover, the compounds have a good activity against parasitic fungi on plant parts above ground, such as Mycosphaella, Cercospora, and Colletotrichum species.

Since the 2-aminobenzothiazole derivatives have mainly a protective effect, mixtures with curative agents are advantageous. Organic mercury compounds, such as phenyl-mercury acetate and Blasticidin S can be used for this purpose. By the addition of the substances according to the invention a substantial reduction of the mercury content can be achieved in mixed preparations. In this way, the disadvantages involved by the sole use of organic mercury compounds, e.g., the high toxicity towards warm-blooded animals can be reduced. By the combination of protective and curative preparations as in the mixture mentioned above, it is possible to attain an increased effectiveness and a wider range of activity.

The 2-aminobenzothiazole derivatives can be converted into the usual formulations, such as emulsifiable concentrates, spray powders, pastes, soluble powders, dusts and granulates. These are prepared in known manner, for example by extending the active substances with solvents and/or carriers, possibly with the use of emulsifiers and/or dispersion agents (cf. Agricultural Chemicals, March 1960, pages 35–38). Suitable auxiliaries for this purpose are chiefly: solvents, such as aromatics (e.g. xylene and benzene), chlorinated aromatics (e.g. chlorobenzenes), paraffins (e.g., petroleum fractions), alcohols (e.g., methanol, butanol), amines (e.g., ethanolamine, dimethyl formamide), and water; carrier substances such as natural stone powders (e.g., kaolins, aluminas, talc, chalk) and synthetic stone powders (e.g., highly dispersed silicic acid, silicates), emulsifiers, such as non-ionic and anionic emulsifiers (e.g., polyoxyethylene fatty acid esters, polyoxyethylene fatty alcohol ethers, alkyl sulphonates and aryl sulphonates), and dispersing agents, such as lignin, sulphite waste liquors and methyl cellulose.

The active substances according to the invention can be present in the formulations in admixture with other known active ingredients.

The formulations generally contain between 0.1 and 95, preferably between 0.5 and 90, percent by weight of active substance.

The substances to be used or their preparations are applied in the usual manner, for example by spraying, dusting, sprinkling or atomizing. The active substance can be applied in concentrations between 0.2 and 0.005%, depending upon the intended use. In specific cases, however, it is also possible to go above or below this range of concentration.

The following examples are given for the purpose of illustrating the invention.

EXAMPLE A.—PIRICULARIA TEST/LIQUID PREPARATION OF ACTIVE SUBSTANCE

Solvent: 1 part by weight acetone
Dispersing agent: 0.05 part by weight sodium oleate
Other additives: 0.2 part by weight gelatin
Water: 98.53 parts by weight $H_2O$.

The amount of active compound required for the desired concentration in the spray liquor is mixed with the stated amount of solvent and the concentrate obtained diluted with the stated amount of water containing the mentioned additives.

Thirty rice plants, which are about 14 days old, are sprayed with the spray liquor until dripping wet. The plants remain in a greenhouse at a temperature of 22 to 24° C. and at a relative atmospheric humidity of about 70%. They are then inoculated with an aqueous suspension of 100,000 to 200,000 spores/ml. of *Piricularia oryzae* and placed in a chamber at 24–26° C. and at a relative atmospheric humidity of 100%.

Five days after inoculation, the degree of infestation of all the leaves of the treated plants which were present at the time of inoculation is determined as a percentage of the untreated but also inoculated control plants. 0% means that no infestation occurred and 100% that the infestation is exactly the same as that of the control plants.

The active compounds, their concentrations and the results obtained can be seen from the following Table I:

*Table I.—Piricularia test/liquid preparation of active substance*

| No. | Active substance | Infestation in percent of the infestation of the untreated control with a concentration of active substance of— | | |
|---|---|---|---|---|
| | | 0.05% | 0.025% | 0.01% |
| (1) | C—NH—S—CFCl₂ | 0 | 0 | 17 |
| (2) | C—NH—S—CCl₃ | 21 | | |
| (3) | C—NHSCF₂Cl | 0 | | 40 |

EXAMPLE B.—PIRICULARIA TEST/SOLID PREPARATION OF ACTIVE SUBSTANCE

Solvent: 10 parts by weight acetone
Dust base: 100 parts by weight 95.5% of calcium carbonate
4.0% of silicic acid
0.5% of Mg. stearate The amount of active compound required for the desired concentration in the dusting agent is mixed with the stated amount of solvent and the concentrate obtained triturated in a mortar with the stated amount of dust base until the solvent has evaporated.

Thirty rice plants, which are about 14 days old, are dusted with this agent. They are then inoculated with an aqueous suspension of 100,000 to 200,000 spores/ml. of *Piricularia oryzae* and placed in a chamber at 24–26° C. and a relative atmospheric humidity of 100%.

Five days after inoculation, the infestation of all the leaves of the treated plants which were present at the time of inoculation is determined as a percentage of the untreated but also inoculated control plants. 0% means that no infestation occurred and 100% that the infestation is exactly the same as that of the control plants.

The active compounds, their concentrations and the results can be seen from the following Table II:

*Table II.—Piricularia test/solid preparation of active substance*

| No. | Active substance | Infestation in percent of the infestation of the untreated control with a concentration of active substance of— | |
|---|---|---|---|
| | | 0.1% | 0.05% |
| (1) | C—NH—S—CFCl₂ | 0 | 17 |
| (2) | C—NH—S—CCl₃ | 6 | 75 |
| (3) | C—NHSCF₂Cl | 3 | 8 |

EXAMPLE C.—MYCELIUM GROWTH TEST

Nutrient medium:
  20 parts by weight agar-agar
  30 parts by weight malt extract
  950 parts by weight distilled water
Ratio of solvent to nutrient medium:
  2 parts by weight acetone
  100 parts by weight agar nutrient medium.

The amount of active compound required for the desired concentration in the nutrient medium is mixed with the stated amount of solvent. The concentrate obtained is thoroughly mixed, in the stated ratio, with the liquid nutrient medium, the temperature of which is 42° C., and then poured into petri dishes of 9 cm. diameter. Control dishes without the active compound are also provided.

When the nutrient medium has cooled and solidified, the dishes are inoculated with the fungi specified in the table and incubated at about 21° C.

Evaluation is carried out after 4–10 days, dependent upon the rate of growth of the fungi. For evaluation, the radial growth of the mycelium on the treated nutrient media is compared with the growth on the control media. The evaluation of the mycelium growth is made as follows:

0 no mycelium growth
1 very strong inhibition of growth
2 medium inhibition of growth
3 slight inhibition of growth
4 growth equal to that of untreated control.

The active compounds, their concentrations and the results can be seen from the following Table III.

Table III.—Mycelium growth test

| Active subst. | Concentration of active subst., p.p.m. | Piricularia oryzae | Corticium sasakii | Cochliobolus miyabeanus | Mycosphaerella musicola | Cercospora personata | Cercospora coffeicola | Botrytis cinerea | Alternaria tenuis | Phialophora cinerescens | Verticillium albo-atrum | Fusarium oxysp. f. cubense | Fusarium oxysp. f. dianthi |
|---|---|---|---|---|---|---|---|---|---|---|---|---|---|
| C—NHSCF₂Cl (benzothiazole) | 500 | 0 | 1 | 0 | 0 | 0 | 0 | 0 | 1 | 0 | 0 | 0 | 0 |
|  | 250 | 0 | 2 | 0 | 0 | 0 | 0 | 0 | 1 | 0 | 0 | 0 | 0 |
|  | 100 | 0 | — | 0 | 0 | 0 | 0 | 1 | 2 | 0 | 0 | 0 | 1 |
| Cl—...C—NH—SCFCl₂ | 500 | 0 | 0 | 0 | 0 | 0 | 0 | 0 | 0 | 0 | 0 | 0 | 0 |
|  | 250 | 0 | 0 | 2 | 0 | 0 | 1 | 3 | 1 | 1 | 1 | 0 | 1 |
|  | 100 | 0 | 0 | 3 | 0 | 0 | 2 | 3 | 3 | 2 | 2 | 0 | 1 |
| C—NH—S—CFClBr | 500 | 0 | 0 | 0 | 0 | 0 | 0 | 0 | 0 | 0 | 0 | 0 | 0 |
|  | 250 | 0 | 0 | 0 | 0 | 0 | 0 | 0 | 0 | 0 | 0 | 0 | 0 |
|  | 100 | 0 | 1 | 0 | 0 | 0 | 0 | 0 | 0 | 0 | 0 | 0 | 0 |
| CH₃, Cl—...C—NH—SCFCl₂ | 500 | 0 | 1 | 0 | 0 | 0 | 1 | 1 | 2 | 0 | 1 | 0 | 1 |
|  | 250 | 0 | 1 | 0 | 0 | 0 | 2 | 1 | 2 | 0 | 1 | 0 | 1 |
|  | 100 | — | — | 0 | — | — | — | 1 | 2 | — | — | 0 | 1 |
| C—NH—S—CCl₃ | 500 | 1 | 2 | 1 | 0 | 0 | 0 | 0 | 1 | 1 | 1 | 0 | 0 |
|  | 250 | 2 | 4 | 4 | 0 | 0 | 1 | 3 | 4 | 2 | 2 | 3 | 4 |
|  | 100 | 3 | — | — | 1 | 0 | 2 | 4 | — | 2 | 2 | 3 | — |

We claim:

1. A method for controlling phytopathogenic fungi which comprises contacting said fungi with an effective amount of a compound of the formula

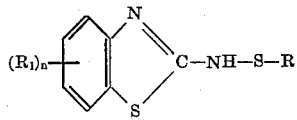

in which

R is trihalogenomethyl, containing as halogen a member selected from the group consisting of chlorine, bromine and fluorine, at least one chlorine atom being present;

R₁ is a member selected from the group consisting of hydrogen, halogen, alkoxy of 1–4 carbon atoms and nitro; and n is an integer of 0–4.

2. A method for controlling phytopathogenic fungi which comprises applying to said fungi an effective amount of a compound of the formula

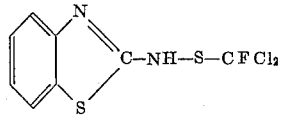

3. A method for controlling phytopathogenic fungi which comprises applying to said fungi an effective amount of a compound of the formula

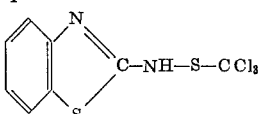

4. A method for controlling phytopathogenic fungi which comprising applying to said fungi an effective amount of a compound of the formula

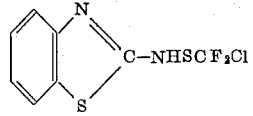

5. A method for controlling phytopathogenic fungi which comprises applying to said fungi an effective amount of a compound of the formula

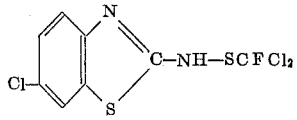

6. A method for controlling phytopathogenic fungi which comprises applying to said fungi an effective amount of a compound of the formula

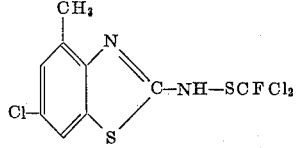

7. A method for controlling phytopathogenic fungi which comprises applying to said fungi an effective amount of the 2-aminobenzothiazole of the formula

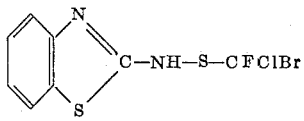

No references cited.

JULIAN S. LEVITT, *Primary Examiner.*